No. 883,873. PATENTED APR. 7, 1908.
E. C. GAGE.
RETICULATED CURRYCOMB.
APPLICATION FILED APR. 26, 1907.
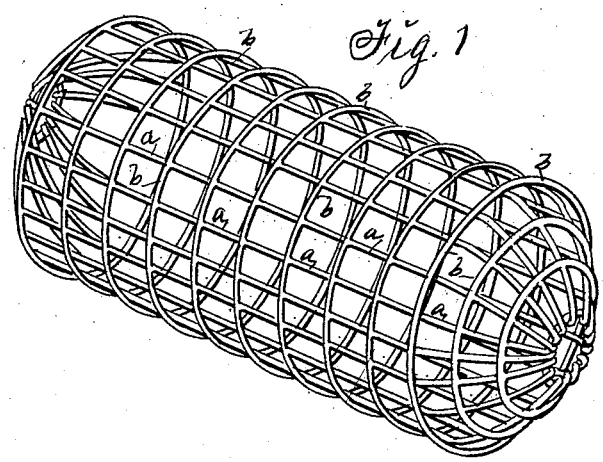
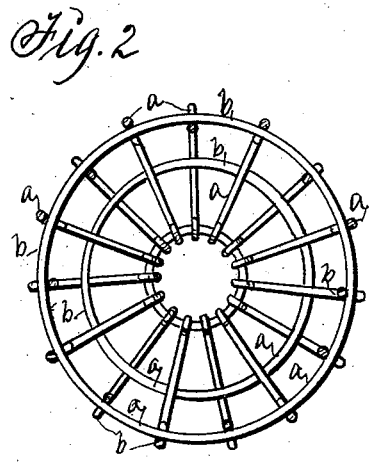
Witnesses: Inventor: Ezra C. Gage,
K. K. Keffer.
R. H. Orwig. By Thomas G. Orwig & Co. Attorneys.

UNITED STATES PATENT OFFICE.

EZRA C. GAGE, OF SHENANDOAH, IOWA, ASSIGNOR OF ONE-HALF TO E. F. CLOVIS, OF SHENANDOAH, IOWA.

RETICULATED CURRYCOMB.

No. 883,873.　　　Specification of Letters Patent.　　　Patented April 7, 1908.

Application filed April 26, 1907. Serial No. 370,696.

*To all whom it may concern:*

Be it known that I, EZRA C. GAGE, a citizen of the United States, residing at Shenandoah, in the county of Page and State of Iowa, have invented a new and useful Reticulated Currycomb, of which the following is a specification.

My object is to provide a new and useful article of manufacture specially adapted to be inclosed in a person's hand to be manually operated without a handle for cleaning dried sweat from the body of a horse and dried mud from the legs of the animal by simply rubbing with the device in the manner corn cobs have heretofore been used to accomplish such purposes.

My invention consists in a reticulated round skeleton, made of wire, of suitable length and diameter as hereinafter set forth, pointed out in my claims and illustrated in the accompanying drawings, in which—

Figure 1 is a perspective view of the complete article ready for use and Fig. 2 is a transverse sectional view through one end portion that shows the tapering end practically closed.

The letters $a$ designate wires extending longitudinally and interwoven therewith are wires $b$ that are circumferential and woven to the wires $a$. The wires $a$ are bent inwards at their ends and converge towards the center and the coiled wires $b$ are reduced accordingly in circumference as required to produce tapering ends of the longitudinal device that may vary in length and diameter as desired.

All the ends of the longitudinal wires $a$ are fastened to the end coils of the wires $b$ and the cylindrical skeleton frame and curry comb is thus produced and finished complete without a handle for fastening the ends of the wires or to operate by means of a handle.

When the wires $a$ and $b$ simply cross each other they are readily fastened together wherever they contact with each other by means of solder in a common way.

In the practical use of my invention the device is readily held and manipulated conveniently and advantageously in a person's hand to press and rub it over all parts of the body and legs of an animal as required for cleaning off dirt therefrom and the tapering ends are specially adapted for entering creases and concaves in the animal and cleaning parts of the feet above the hoofs.

Having thus set forth the purposes of my invention and the manner of its use the practical operation and utility thereof is obvious.

What I claim as new and desire to secure by Letters-Patent, is:—

1. In a reticulated curry comb, a plurality of wires extended longitudinally, and curved inwards at their ends, wire coiled around and fixed to the longitudinal wires and the ends of the longitudinal wires fixed to the ends of the coiled wire to produce a body portion of uniform diameter with tapering ends as set forth.

2. A reticulated curry comb comprising coiled wire and a plurality of straight wires curved inwards at their ends and fixed to the end coils of the coiled wire, as set forth.

EZRA C. GAGE.

Witnesses:
　E. F. CLOVIS,
　R. W. D. RIPLEY.